US010712854B2

(12) United States Patent
Akabane et al.

(10) Patent No.: US 10,712,854 B2
(45) Date of Patent: Jul. 14, 2020

(54) INPUT DEVICE

(71) Applicant: FUJITSU COMPONENT LIMITED, Tokyo (JP)

(72) Inventors: Ayumu Akabane, Tokyo (JP); Tsuyoshi Kanda, Tokyo (JP); Fumio Takei, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/163,864

(22) Filed: Oct. 18, 2018

(65) Prior Publication Data
US 2019/0138140 A1 May 9, 2019

(30) Foreign Application Priority Data
Nov. 7, 2017 (JP) .................. 2017-215061

(51) Int. Cl.
| | |
|---|---|
| G06F 21/44 | (2013.01) |
| G06F 3/041 | (2006.01) |
| G06F 3/01 | (2006.01) |
| G06F 3/044 | (2006.01) |
| G06F 3/0488 | (2013.01) |
| G06F 3/0484 | (2013.01) |
| G06F 21/31 | (2013.01) |

(52) U.S. Cl.
CPC ............ G06F 3/0412 (2013.01); G06F 3/016 (2013.01); G06F 3/044 (2013.01); G06F 3/04847 (2013.01); G06F 3/04883 (2013.01); G06F 21/31 (2013.01)

(58) Field of Classification Search
None
See application file for complete search history.

(56) References Cited

U.S. PATENT DOCUMENTS

2008/0164982 A1*  7/2008  Andrews .................. G06F 3/016
                                                            340/407.2
2015/0294104 A1* 10/2015  Kolagi ................. G06F 3/04817
                                                                  726/19

FOREIGN PATENT DOCUMENTS

| JP | 2011-44029 | 3/2011 |
| JP | 2011-209832 | 10/2011 |

OTHER PUBLICATIONS

Japanese Platform for Patent Information English abstract for Japanese Patent Publication No. 2011-44029, published Mar. 3, 2011.
Japanese Platform for Patent Information English abstract for Japanese Patent Publication No. 2011-209832, published Oct. 20, 2011.

* cited by examiner

*Primary Examiner* — Carl Adams
(74) *Attorney, Agent, or Firm* — Staas & Halsey LLP

(57) ABSTRACT

An input device includes: a touch panel; a tactile presentation device that is mounted on the touch panel, and presents a tactile feel; and a control device that detects a position of a finger in accordance with information from the touch panel, controls the tactile presentation device to present the tactile feel in accordance with the position of the finger, and confirms an input value, the input value being the number of times the tactile feel is presented before input confirmation.

6 Claims, 16 Drawing Sheets

INPUT DEVICE

CROSS-REFERENCE TO RELATED APPLICATION

This application is based upon and claims the benefit of priority of the prior Japanese Patent Application No. 2017-215061 filed on Nov. 7, 2017, the entire contents of which are incorporated herein by reference.

FIELD

A certain aspect of the embodiments is related to an input device.

BACKGROUND

Input devices that prevent leakage of authentication codes have been known (see Japanese Patent Application Laid-Open No. 2011-44029, for example). Such an input device includes: a touch sensor that accepts an input; a tactile presentation unit that causes the surface of the touch sensor to vibrate; and a control unit that performs control so that the tactile presentation unit presents a tactile feel intermittently to the object in contact with the touch-sensitive surface when the touch sensor accepts an input, and an authentication code based on the number of tactile presentation times is accepted when an input determining operation is detected.

In the above input device, time is used as a trigger to present a tactile feel. Therefore, others can easily guess an input value from the period of time during which the object is in touch with the touch panel.

SUMMARY

According to an aspect of the present invention, there is provided an input device including: a touch panel; a tactile presentation device that is mounted on the touch panel, and presents a tactile feel; and a control device that detects a position of a finger in accordance with information front the touch panel, controls the tactile presentation device to present the tactile feel in accordance with the position of the finger, and confirms an input value, the input value being the number of times the tactile feel is presented before input confirmation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a case where time is used as a trigger to present a tactile feel, if the period between a time during which the touch-sensitive surface of the touch sensor is made to vibrate (this time will be hereinafter referred to as a tactile presentation period) and the next tactile presentation period is made longer, the entire input time becomes longer.

The following is a description of an embodiment of the present invention, with reference to the drawings.

Figure 1:
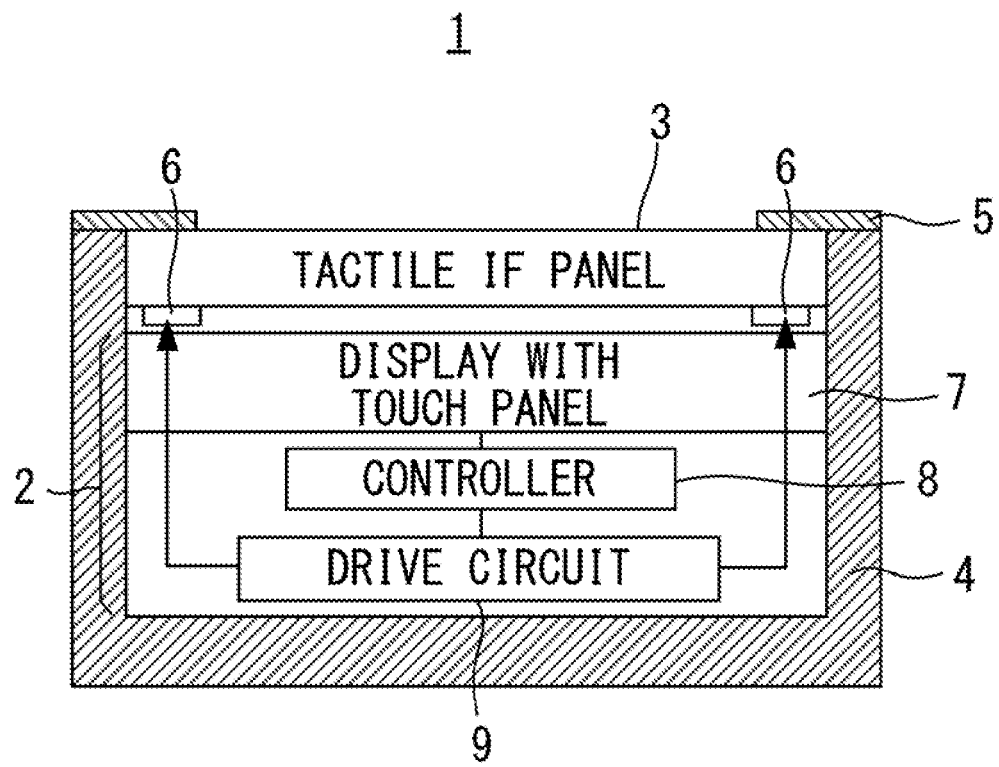
FIG. 1 is a configuration diagram of an input device according to this embodiment.

FIG. 1 is a configuration diagram of an input device according to this embodiment.

The input device 1 in FIG. 1 includes: an information processing terminal 2 such as a smartphone or a touch pad; a tactile interface (IF) panel 3 as a tactile presentation device disposed on the terminal 2; a housing 4 that houses the terminal 2 and the tactile IF panel 3; and a cover 5 that covers the outer periphery of the upper surface of the tactile IF panel 3. Piezoelectric elements 6 bonded onto the tactile IF panel 3 are used for providing a tactile feel such as a feel of unevenness or a feel of a click when the operator slides a finger on the surface of the tactile IF panel 3. The terminal 2 includes a display 7 equipped with a touch panel, a controller 8 serving as a control device, and a drive circuit 9. The tactile IF panel 3 is transparent, and the operator can see the data displayed on the display 7. The touch panel is a capacitive touch panel, but may be a touch panel of some other type.

When the operator touches the tactile IF panel 3 with a finger, the controller 8 detects the touched position with the touch panel. The controller 8 also detects detachment of the finger from the tactile IF panel 3. In a case where the finger of the operator slides, the controller 8 further calculates the distance and the direction of movement of the finger, the angle and the direction of rotation of the sliding, and the like. The controller 8 also counts the number of times a feel of unevenness or a feel of a click is presented.

Before the finger reaches a tactile presentation position where a tactile feel is presented and after the finger has passed the tactile presentation position, the controller 8 outputs an ON signal to the drive circuit 9. In accordance with the ON signal from the controller 8, the drive circuit 9 supplies a drive voltage to the piezoelectric elements 6. The piezoelectric elements 6 cause vibration of the ultrasonic band, to form a low-friction state in the panel surface. Thus, the operator can smoothly slide the finger on the surface of the tactile IF panel 3.

When the finger has reached the tactile presentation position, the controller 8 outputs an OFF signal to the drive circuit 9. The drive circuit 9 stops the voltage supply to the piezoelectric elements 6 in accordance with the OFF signal from the controller 8, and the piezoelectric elements 6 stops the vibration. As a result, the finger feels like being caught on the surface of the tactile IF panel 3. In this manner, a feel of unevenness or a feel of a click is presented. Note that, to present a different tactile feel from the tactile feel presented in the other regions when the finger has reached the tactile presentation position, it is also possible to output an ON signal at the tactile presentation position for presenting the different tactile feel instead of an OFF signal. However, to facilitate the operator's recognition of the numerical values and the like described below, presenting a non-smooth feel and a smooth feel by switching between high friction and low friction depending on the existence/absence of vibration is preferable rather than to just changing vibration types of tactile feel. Hereinafter, a feel of unevenness, a feel of art click, a feel of smoothness or non-smoothness, and the like will be all referred to as a "tactile feel".

Figure 2:
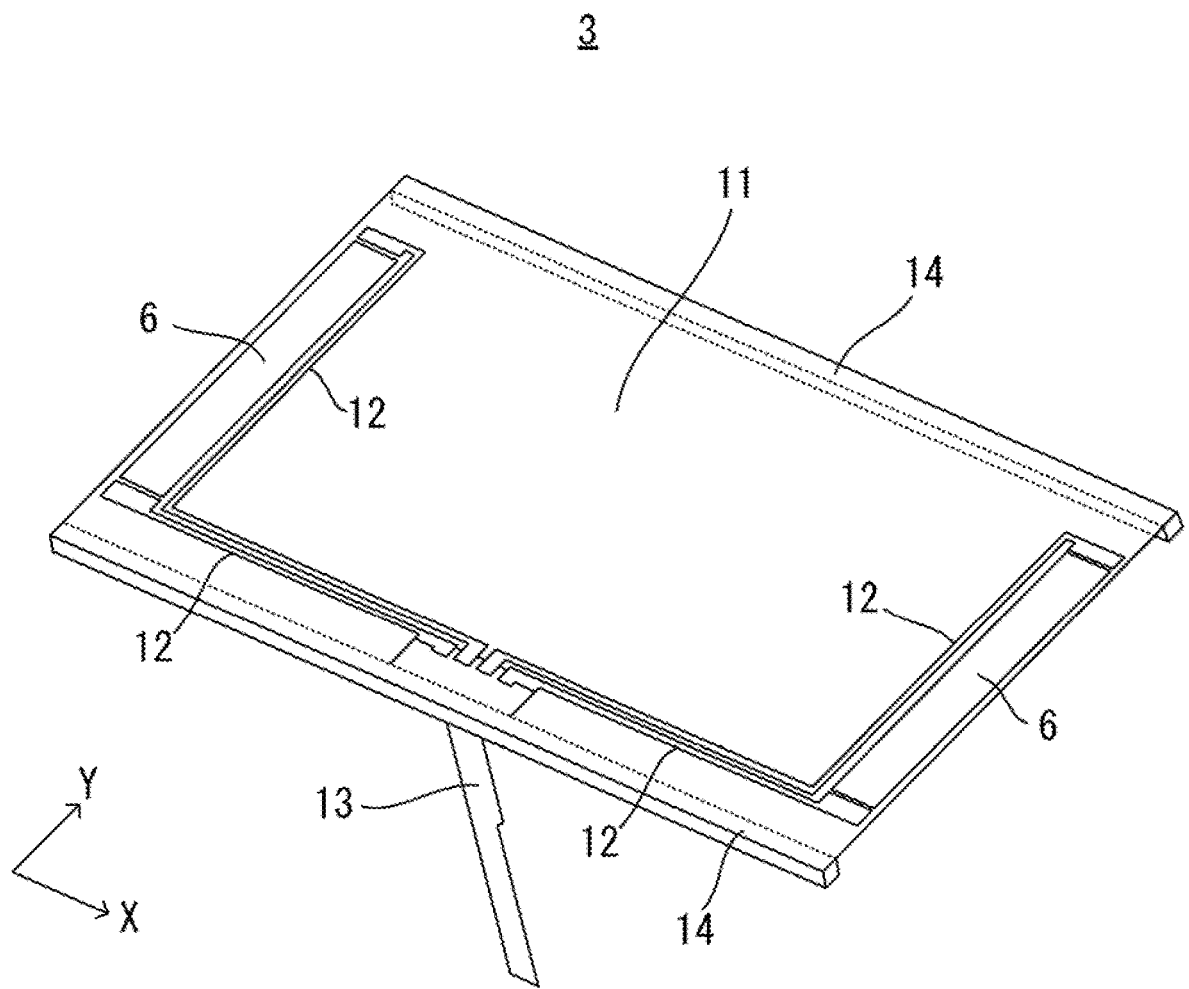
FIG. 2 is a configuration diagram of a tactile IF panel.

FIG. 2 is a configuration diagram of the tactile IF panel 3.

The tactile IF panel 3 includes: a vibration panel 11 formed with a transparent rectangular glass; the piezoelectric elements 6 provided at both X-direction ends of the vibration panel 11; a wiring pattern 12 formed on the vibration panel 11 so as to sandwich both Y-direction ends of each piezoelectric element 6; a flexible printed circuit (FPC) 13 connected to the wiring pattern 12; and a base 14 for securing the vibration panel 11 to the housing 4. The FPC 13 is connected to the drive circuit 9 illustrated in FIG. 1. The wiring pattern 12 is formed by printing and baking of silver paste. Thus, the known wiring pattern manufacturing technique can be applied.

Figure 3A:
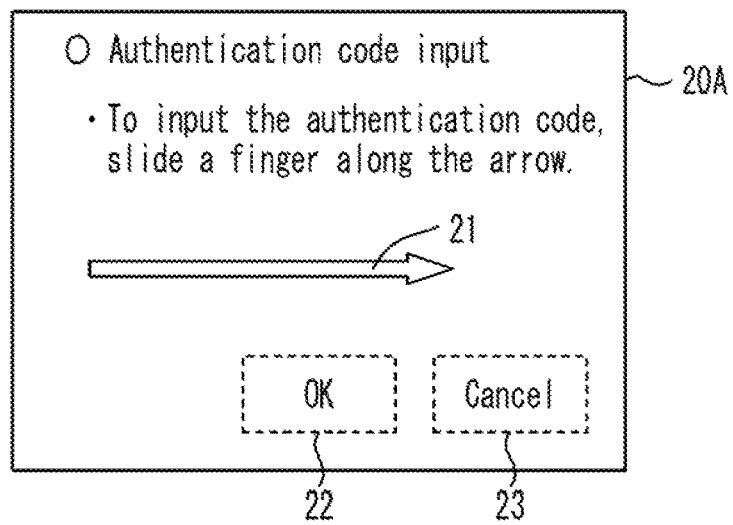
FIG. 3A and FIG. 3B are diagrams illustrating examples of code input screens displayed on a display.
Figure 3B:
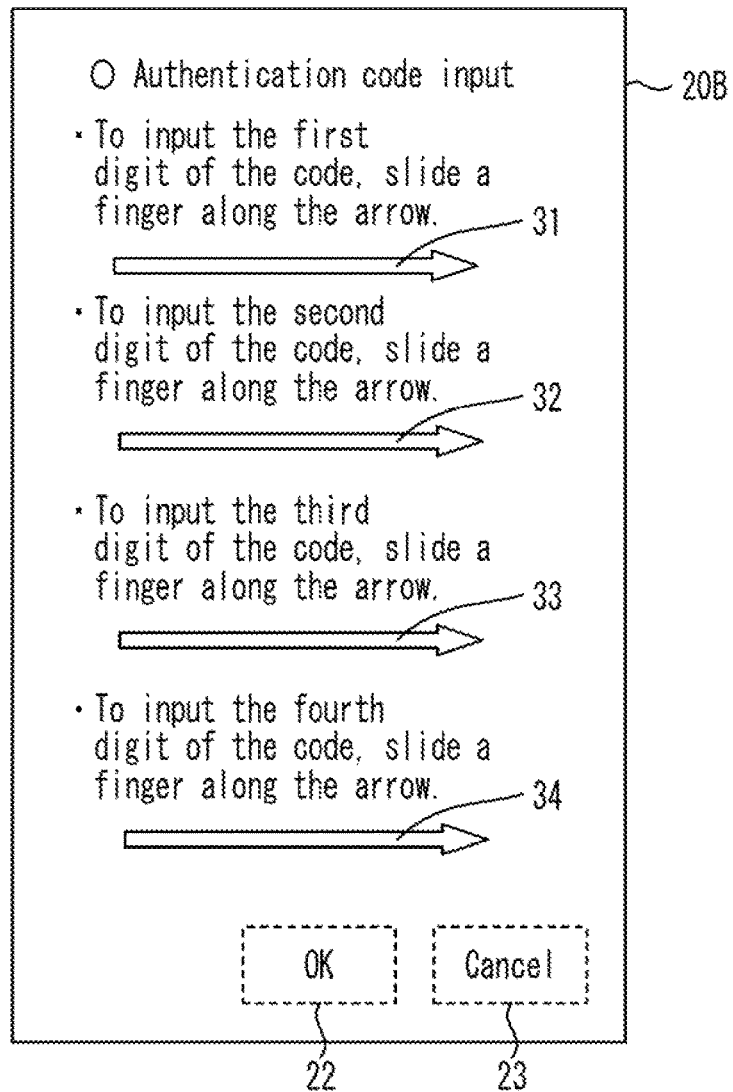
Figure 4A:
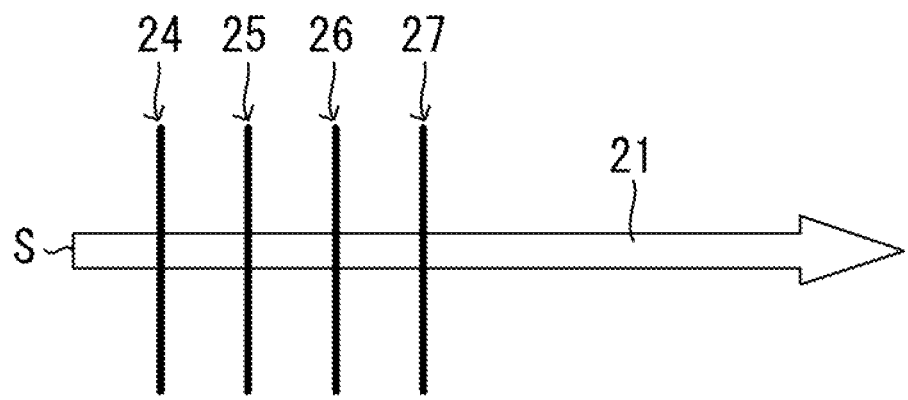
FIG. 4A and FIG. 4B are diagrams illustrating positional relationships between authentication code input regions and tactile presentation positions.
Figure 4B:
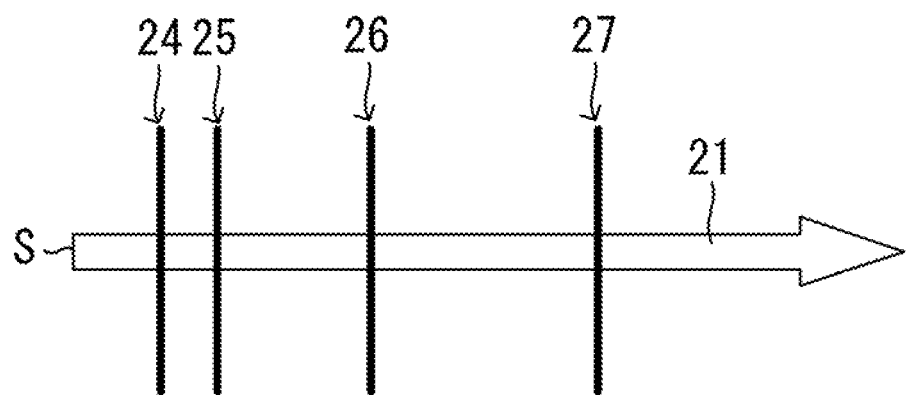

FIG. 3A and FIG. 3B are diagrams illustrating examples of code input screens for inputting authentication code displayed on the display 7. FIG. 4A and FIG. 4B are diagrams illustrating positional relationships between an authentication code input region and presentation positions of a feel of unevenness or a feel of a click.

An authentication code is a secret code or a password, and is formed with numerical characters, alphabets, or a combination of numerical characters and alphabets. The authentication code is registered in advance, and the operator performs the operation described below in accordance with the authentication code.

In this embodiment, a numerical character is used as the authentication code. In this case, the number of tactile presentation times and the numerical value of the authentication code are associated with each other. When the number of tactile presentation times is "3", the numerical value of the authentication code indicates "3". Alternatively, the number of tactile presentation times (1, 2, 3, . . . ) may be associated with each of the alphabets (a, b, c, . . . ). In this case, when the number of tactile presentation times is "3". The alphabet to be input as the authentication code is "c".

A code input screen 20A illustrated in FIG. 3A includes, one authentication code input region 21. A code input screen 20B illustrated in FIG. 3B includes four input regions 31 through 34. The input regions 21 and 31 through 34 are regions on which the operator is to slide a finger. In FIG. 3A, when a multi-digit authentication code is to be input, the one input region 21 is used for inputting each digit on the input screen 20A. The respective input regions 31 through 34 in FIG. 3B correspond to the respective characters of the multi-digit authentication code. In the example of FIG. 3B, the number of digits of the authentication code can be guessed from the number of the displayed input regions. Therefore, it is possible to adopt such a design that the number of the input regions and the number of the digits of the authentication code do not match each other. Further, the input screens 20A and 20B may include an OK button 22 for confirming an authentication code input and a cancel button 23 for canceling an authentication code input.

The left end of each of die input regions 21 illustrated in FIG. 4A and FIG. 4B is an input start position S. When the operator starts sliding a finger on the input region 21 from the start position S, a tactile feel is presented every time the finger reaches a certain position (such as lines 24 through 27) on the arrow, as illustrated in FIG. 4A. The lines 24 through 27 in FIG. 4A indicate tactile presentation positions in which tactile feeling is presented, and the number of the lines from the start position S corresponds to the number of tactile presentations. In the examples illustrated in FIG. 4A and FIG. 4B, the number of tactile presentations is four in total. When an authentication code is input, a tactile feel is presented while the sliding of the finger continues, until an input number is confirmed. In the examples illustrated in FIG. 4A and FIG. 4B, when the finger is slid on the input region 21 beyond the line 27, a tactile feel is presented as appropriate.

The intervals between the tactile presentation positions in one sliding operation may be regular intervals as indicated in FIG. 4A, or may be irregular intervals as indicated in FIG. 4B. In either case, the timings to present a tactile feel are defined by the moving distance of the finger from the operation start position or the position at which a tactile feel was last presented. This aspect also applies in the other examples described later. In a case where the presentation positions are at regular intervals as illustrated in FIG. 4A, others might be able to guess the value of the authentication code from the moving distance of the finger. Therefore, to prevent leakage of the authentication code, a tactile feel is preferably presented at the irregular intervals illustrated in FIG. 4B.

In a case where the authentication code has more than one digit, the intervals between the tactile presentation positions may be changed for the respective input digits of the numerical value. For the respective input digits of the numerical values, the tactile presentation positions may be changed from regular intervals to irregular intervals, or may be changed from irregular intervals to regular intervals. Note that, in a case where a finger is slid on the input region 21 to input an authentication code, the sliding direction is constant.

The operation to confirm an input number as the authentication code is made by 1) removing the finger from the upper surface of the tactile IF panel 3, 2) not moving the finger for longer than a certain period of time, 3) changing the finger sliding direction, 4) pressing a particular key, or the like. The input confirming operation may be some other operation, as long as it can be distinguished from the operation for an authentication code input. Further, it is possible to confirm an input number by pressing the OK button 22 illustrated in FIG. 3A and FIG. 3B, for example.

The number of the tactile presentations at the time when one of these operations is performed is confirmed as the input number.

In a case where a numerical value "4" is to be input, an operation to confirm an input number is performed after the four tactile feels are presented when a finger is slid on the input region 21 in the example of FIG. 4A and FIG. 4B. Through this operation, a numerical value "4" is input. If the operator confirms an input number after the three tactile feels are presented, a numerical value "3" is input even though the numerical value to be input as the authentication code is "4". Further, in a case where a tactile feel is presented more than four times as a result of sliding of a finger on the input region 21 beyond the presentation position 27 and an input number is then confirmed, a numerical value of "5" or greater is input.

Meanwhile, an operation to cancel a number that has been input as the authentication code, or an operation to cancel an input operation is made by 1) changing the finger sliding direction, 2) pressing a particular key, or the like. For example, in a case where the finger is moved in the opposite direction from the direction of the arrow in the input region 21 after an input confirming operation, the controller 8 may cancel the input number that has been confirmed. Alternatively, the cancel button 23 may be pressed to cancel the input number. In a case where the finger is slid in the opposite direction during an operation to input a single-digit numerical value, on the other hand, the controller 8 cancels the operation to input the digit by resetting the count value indicating the number of tactile presentation times.

The operation to change digits of which numbers are to be input is made by 1) resuming the sliding operation that has been suspended, 2) resuming the sliding operation after returning to the start position, 3) changing input regions, or the like. In a case where a different input region is used for each digit of an input number as illustrated in FIG. 3B, the input regions 31 through 34 of the respective digits are operated, so that the numerical values of the respective digits are input.

When a number "0" is input, a numeral value of "10" is used instead, and an operation to confirm an input number is performed when a tactile feel is presented for the tenth time. In a case where ten tactile presentations are required, there is a possibility of miscounting, and it is difficult to distinguish between "10" and "0". Therefore, it is possible to adopt an operation in which "0" is not used as a numerical value in a password.

Figure 5A:
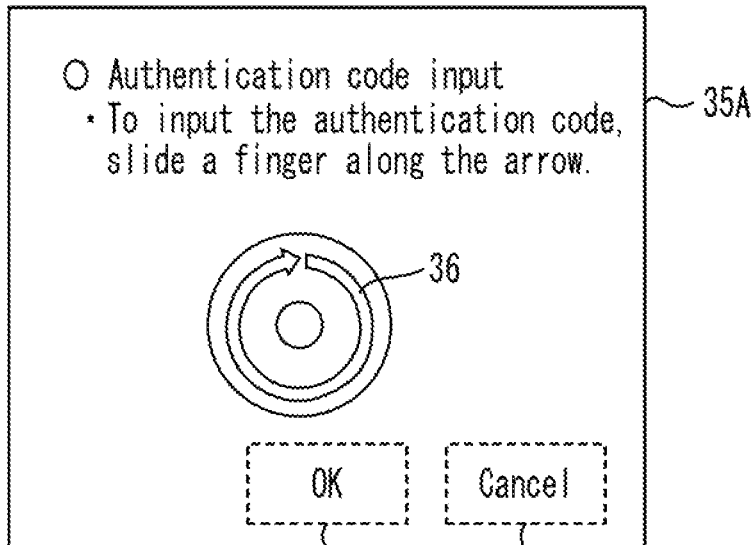
FIG. 5A and FIG. 5B are diagrams illustrating examples of code input screens displayed on the display.
Figure 5B:
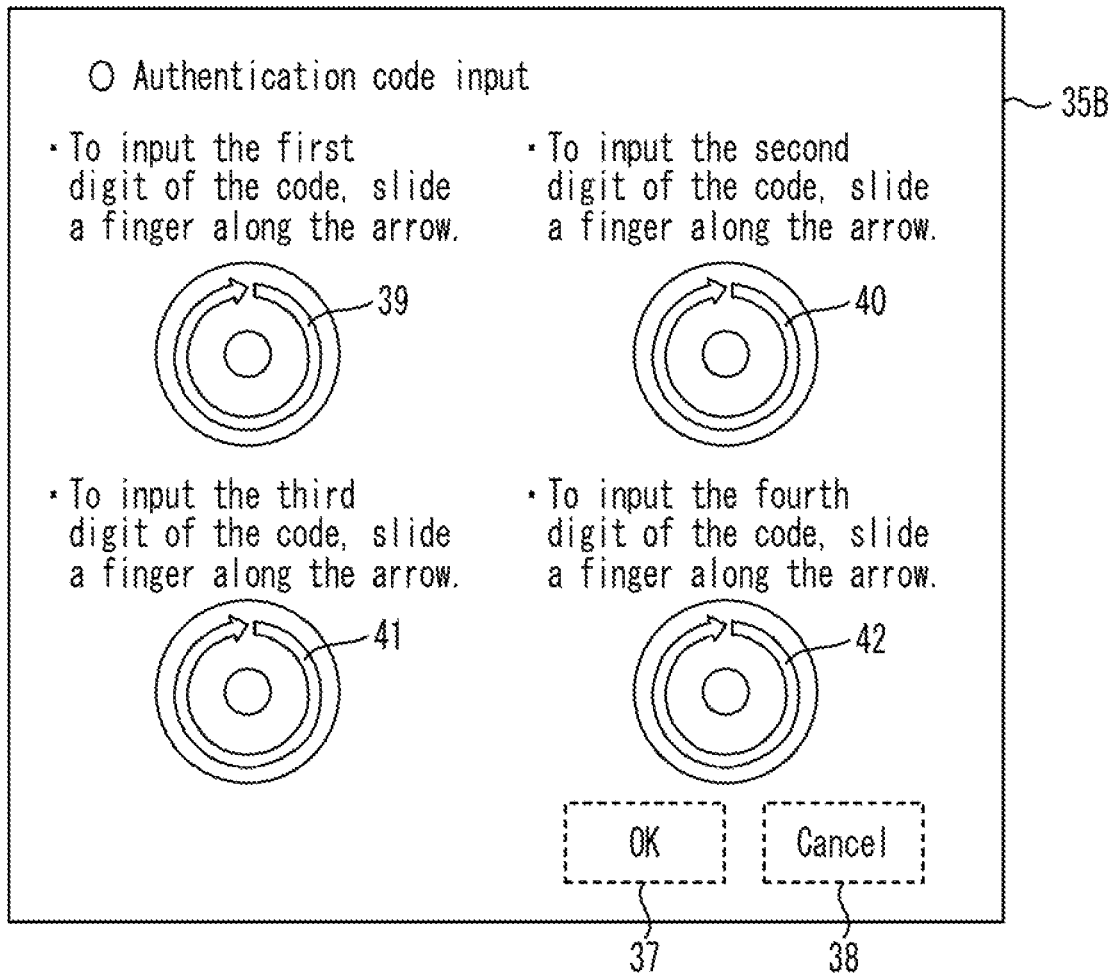
Figure 6A:
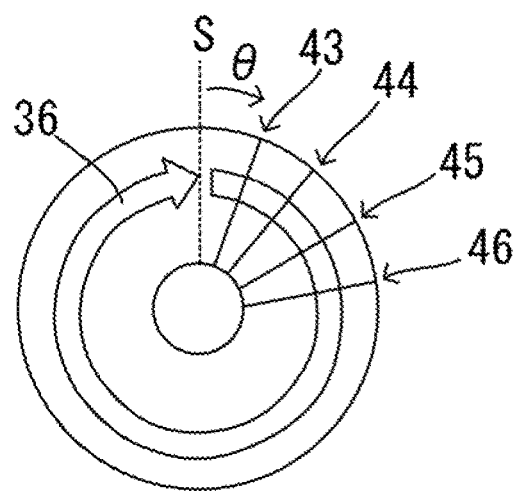
FIG. 6A and FIG. 6B are diagrams illustrating positional relationships between authentication code input regions and tactile presentation positions.
Figure 6B:
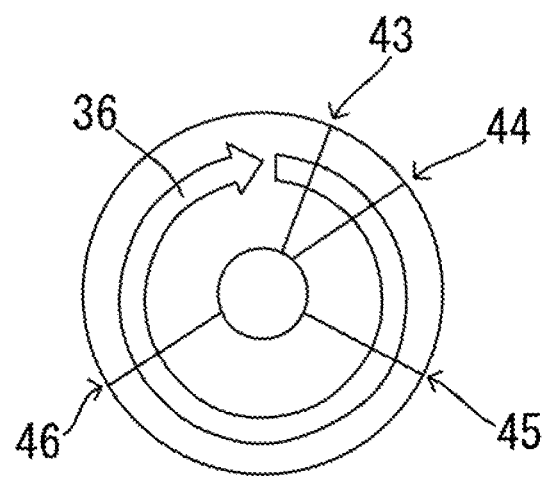

FIG. 5A and FIG. 5B are diagrams illustrating other examples of code input screens displayed on the display 7. FIG. 6A and FIG. 6B are diagrams illustrating positional relationships between input regions and tactile presentation positions. FIG. 5A and FIG. 5B and FIG. 6A and FIG. 6B differ from FIG. 3A and FIG. 3B and FIG. 4A and FIG. 4B in that the input regions are circular in shape.

An input screen 35A illustrated in FIG. 5A includes one input region 36. An input screen 35B illustrated in FIG. 5B includes four input regions 39 through 42 corresponding to the respective digits of a multi digit authentication code. The input screens 35A and 35B may also include an OK button 37 and a cancel button 38.

When the operator starts sliding a finger on the input region 36, a tactile feel is presented every time the finger reaches tactile presentation positions such as lines 43 through 46, as illustrated in FIG. 6A. The number of the lines in FIG. 6A corresponds to the number of tactile presentations from the start of sliding. In the examples illustrated in FIG. 6A and FIG. 6B, the number of tactile presentations is four. A position S in FIG. 6A indicates the start position, and $\theta$ indicates the angle of rotation of the finger.

The intervals between the tactile presentation positions may be regular intervals as indicated in FIG. 6A, or may be irregular intervals as indicated in FIG. 6B. If the tactile presentation positions are at regular intervals as illustrated in FIG. 6A, others might be able to guess the authentication code. Therefore, to prevent leakage of the authentication code, the irregular intervals illustrated in FIG. 6B are preferable.

In a case where the tactile presentation positions are at regular intervals as illustrated in FIG. 6A, the width between the tactile presentation positions may be changed for each input digit of the authentication code. Also, for each digit of the authentication code, the tactile presentation positions may be changed from regular intervals to irregular intervals, or may be changed from irregular intervals to regular intervals. Note that, in a case where a finger is slid on the input region 36 to input an authentication code, the sliding direction is constant. Further, there is no need to complete an input of a numerical value through a 360-degree sliding operation. Depending on the tactile presentation intervals or the numerical value to be input, an input of the numerical value may be completed before a 360-degree sliding operation ends, or may be completed through a sliding operation that exceeds 360 degrees.

The operation to confirm an input number as the authentication code is made by 1) removing the finger from the tactile IF panel 3, 2) not moving the finger for longer than a certain period of time, 3) reversing the finger sliding direction, 4) pressing a particular key, or the like. Further, it is possible to confirm an input number by pressing the OK button 37 illustrated in FIG. 5A and FIG. 5B, for example.

An operation to cancel an input number as the authentication code is made by 1) changing the finger sliding direction to a direction toward the outside of the ring, 2) pressing a particular key, or the like. For example, if a finger is moved from the direction indicated by the arrow in the input region 36 to a direction toward the outside of the ring, the input number may be cancelled. It is also possible to cancel an input by reversing the finger sliding direction, and input cancelling operations are not limited to the above described operation, as long as they can be distinguished from input number confirming operations. Alternatively, the cancel button 38 may be pressed.

The operation to change number input digits is made by 1) resuming the sliding operation that has been suspended, 2) resuming the sliding operation after returning to the start position, 3) changing input regions, or the like. When a different input region is used for each digit of an input number as illustrated in FIG. 5B, the respective input regions are operated to input the numerical values of the corresponding digits.

After an input of the numerical value is confirmed by the means described above with reference to FIG. 3A through FIG. 6B, an authentication process is performed to determine whether a correct authentication code has been input.

In this embodiment, the tactile presentation timing is determined in accordance with the moving distance or the angle of rotation of a finger. This is because, if the tactile presentation timing is determined in accordance with the operation time, the time required for inputting an authentication code becomes longer as the number of tactile presentation times becomes larger. Also, in this embodiment, a tactile feel is presented to the finger sliding on the tactile IF panel 3. Therefore, when a tactile feel is presented in accordance with the elapsed time during the operation, vibration might be switched on or off while the finger is not being moved. In a case where the finger is not moving, the operator might not be able to correctly recognize a tactile feel, or the difference between low friction and high friction. Therefore, in this embodiment, to present a tactile feel to the moving finger, the tactile presentation timing is not determined in accordance with time, but is preferably determined in accordance with the moving distance or the angle of rotation of the finger.

Figure 7:
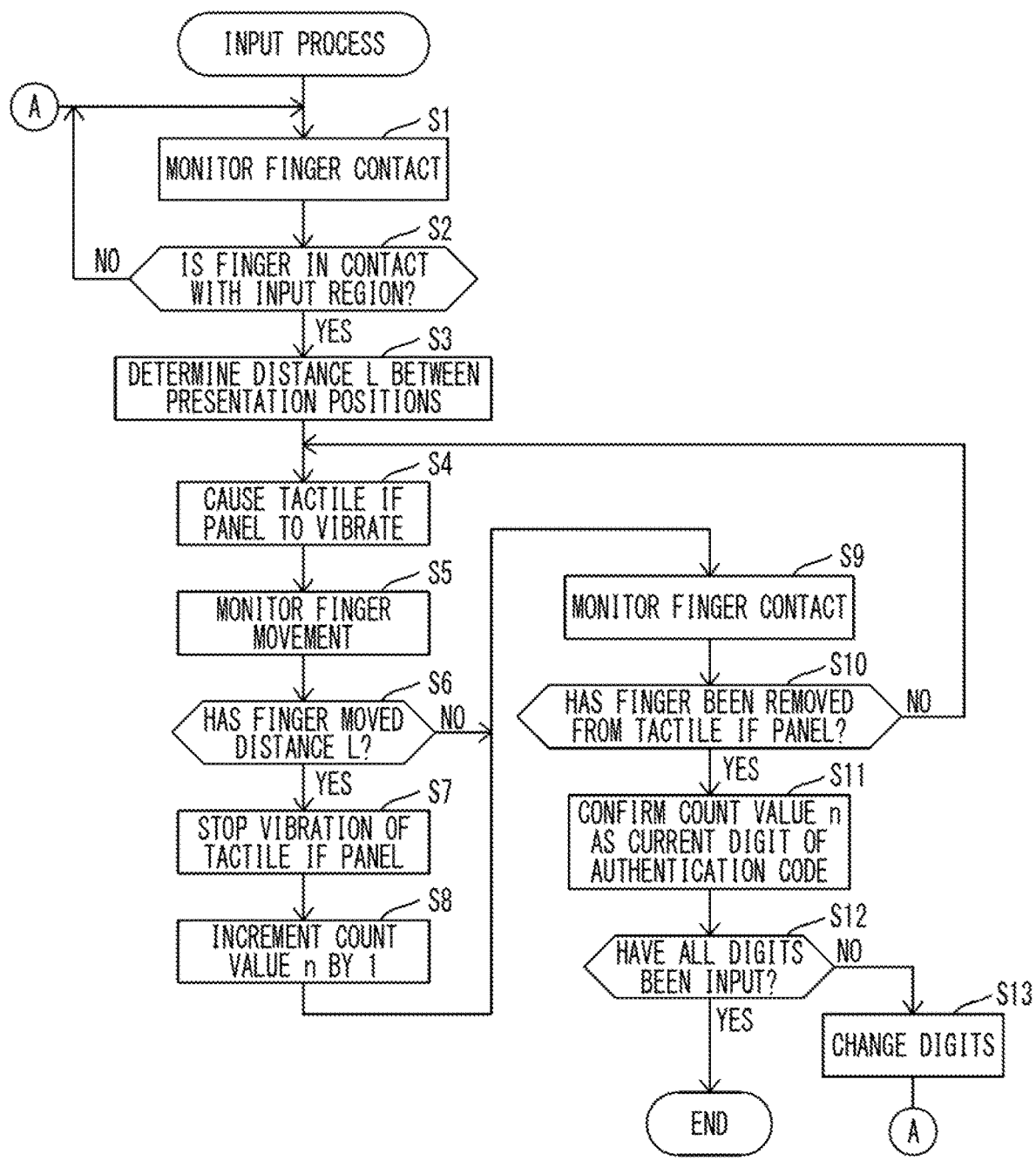
FIG. 7 is a flowchart illustrating an input process to be performed by a controller.

FIG. 7 is a flowchart illustrating an input process to be performed by the controller 8. In FIG. 7, the distances between the tactile presentation positions are the same as illustrated in FIG. 4A, and an input number is confirmed when the finger is removed from the tactile IF panel 3. In this example, the input screen 20A illustrated in FIG. 3A is used as the code input screen. However, the input screen 20B illustrated in FIG. 3B may also be used.

First, the controller 8 monitors whether a finger is in contact with the upper surface of the tactile IF panel 3 (S1). The controller 8 monitors changes in the touch panel output to determine whether a finger is brought into contact with the tactile IF panel 3. In the case of a capacitive touch panel, the controller 8 monitors changes in electrostatic capacitance. When a change in the touch panel output exceeds a threshold value, the controller 8 determines that a finger is in contact with the tactile IF panel 3.

The controller 8 then determines whether the finger is in contact with the input region 21 (S2). If the finger is not in contact with the input region 21 (NO in S2), the process returns to S1. If the finger is determined to be in contact with the input region 21 (YES in S2), the controller 8 determines a distance L between the tactile presentation positions (S3). In this example, the distance L is constant until an input of one digit of the authentication code is confirmed. The distance L may be changed for each digit, or may be the same for each digit. The controller 8 outputs an ON signal to the drive circuit 9, to cause the tactile IF panel 3 to vibrate in the ultrasonic band (S4). At this stage, the upper surface of the tactile IF panel 3 enters a low-friction state, and accordingly, the finger can be moved smoothly.

The controller 8 then monitors movement of the finger in accordance with the touch panel output (S5), and determines whether the finger has moved the distance L from the start of the operation (S6). If the finger has not moved the distance L (NO in S6), the process moves on to S9. If the finger is determined to have moved the distance L (YES in S6), the controller 8 outputs an OFF signal to the drive circuit 9 to stop the vibration of the tactile IF panel 3, to change the tactile feel being presented to the operator (S7). At this stage, the upper surface of the tactile IF panel 3 enters a high-friction state, and thus, the finger being slid on the upper surface can feel like being caught. After the tactile presentation in S7, the controller 8 increments a count value n indicating the number of the tactile feeling presentation by 1 (S8). Note that the count value n is held by the controller 8.

The controller 8 then monitors whether the finger remains in contact with the tactile IF panel 3 (S9). When a change in the touch panel output becomes smaller than the threshold value, the controller 8 determines that the finger has been removed from the tactile IF panel 3. If the finger has not been removed from the tactile IF panel 3 (NO in S10), the input operation for this digit is determined to be continuing, and the process returns to S4. If the finger has been removed from the tactile IF panel 3 (YES in S10), the controller 8 determines that the input operation for the digit has been completed, and confirms the count value n as the value of the authentication code digit being currently input (S11).

The controller 8 determines whether all the digits of the authentication code have been input (S12). If not all the digits have been input (NO in S12), the controller 8 switches the processing target to the next digit (S13). The process then returns to S1, and the input process for the next digit is performed. If all the digits have been input (YES in S12), this input process comes to an end.

After the input numerical values of all the digits are confirmed, an authentication process using the authentication code is performed.

Figure 8:
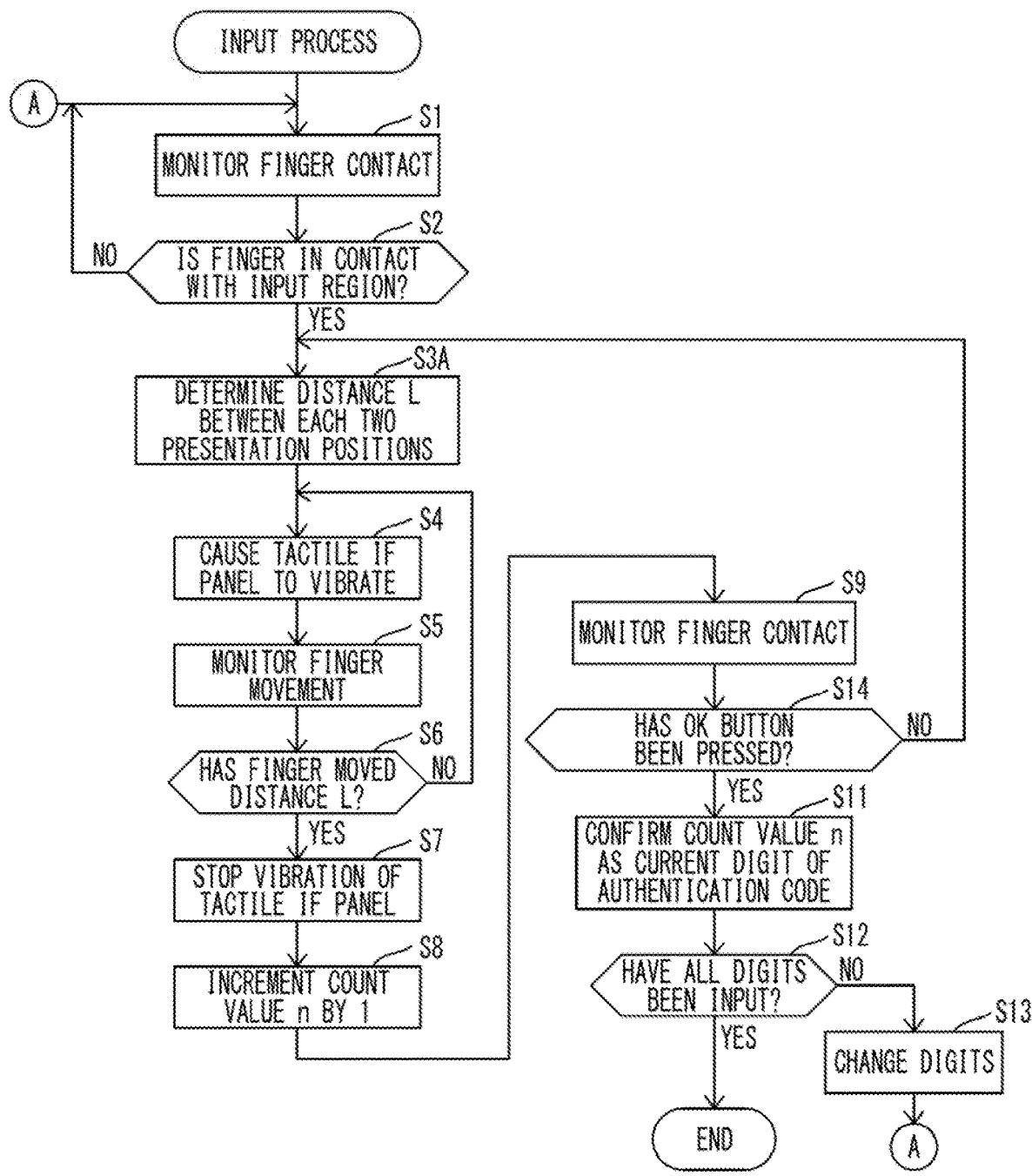
FIG. 8 is a flowchart illustrating an input process to be performed by the controller.

FIG. 8 is a flowchart illustrating an input process to be performed by the controller 8. In FIG. 8, the distances between the tactile presentation positions are irregular as illustrated in FIG. 4B, and the OK button 22 is pressed to confirm an input number. Note that the same procedures as those in FIG. 7 are denoted by the same numbers as those in FIG. 7, and explanation of them is not repeated herein.

If a finger is in contact with the input region 21 (YES in S2), the controller 8 determines a distance L between the presentation positions (S3A). The distance L is changed for each presentation position. If the interval between the first two presentation positions is set to be 5 mm, for example, the controller 8 sets the next interval between presentation positions to be 10 mm.

If the finger has not moved the distance L from the start of the operation (NO in S6), the process returns to S4.

After processing S9, the controller 8 determines whether the OK button 22 has been pressed (S14). If the OK button 22 has not been pressed (NO in S14), the process returns to S3A, and the input process for the digit is continued. If the OK button 22 is determined to have been pressed (YES in S14), the process moves on to S11, and the input number of the digit is confirmed.

Figure 9:
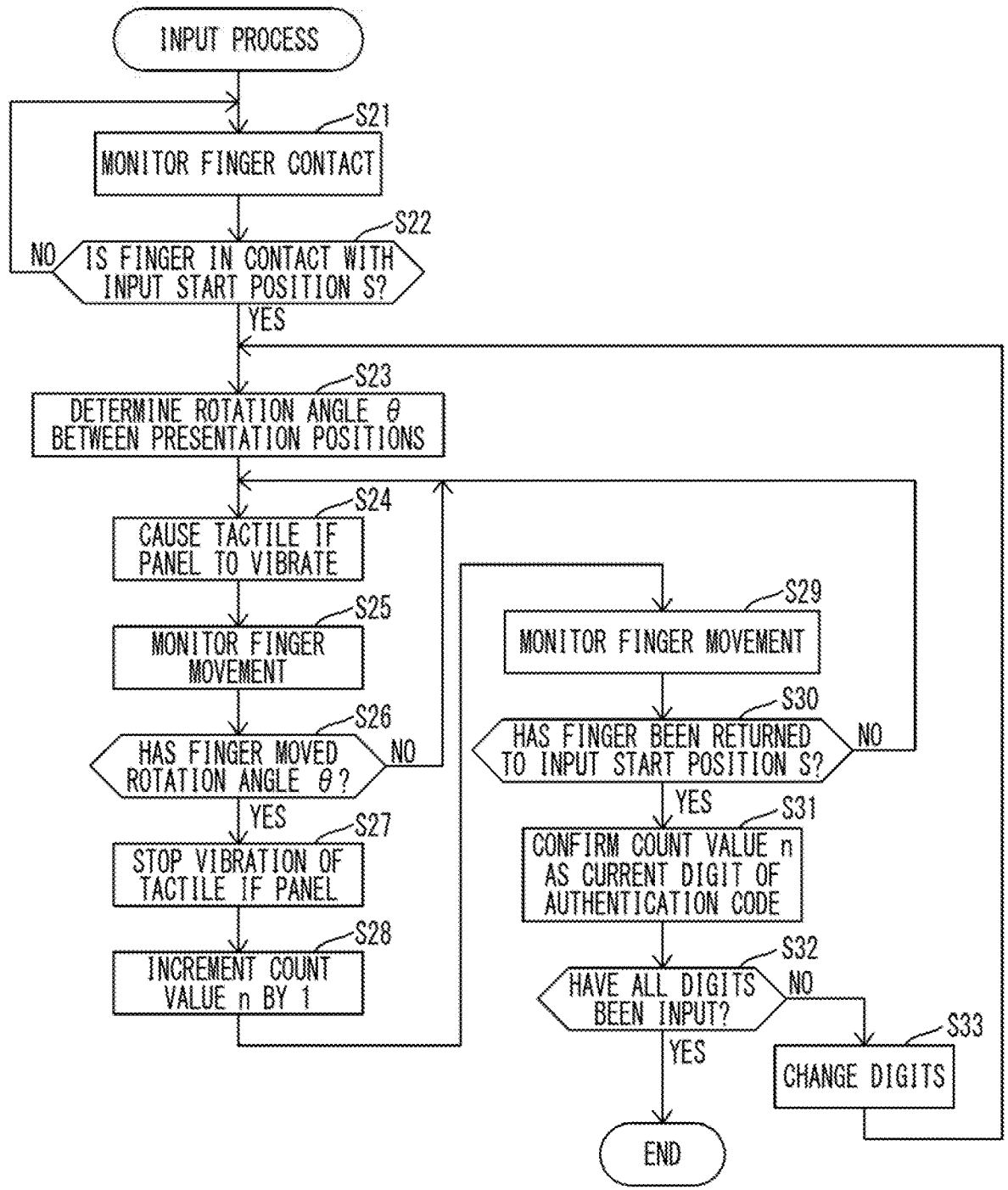
FIG. 9 is a flowchart illustrating an input process to be performed by the controller.

FIG. 9 is a flowchart illustrating an input process to be performed by the controller 8. In FIG. 9, the distances between the tactile presentation positions are the same as illustrated in FIG. 6A, and an input number is confirmed when the number of tactile presentations reaches a desired number of times and the finger is removed from the input region and is returned to the start position S. In this example, the input screen 35A illustrated in FIG. 5A is used as the code input screen. However, the input screen 35B illustrated in FIG. 5B may also be used.

First, the controller 8 monitors whether a finger is in contact with the upper surface of the tactile IF panel 3 (S21). The controller 8 monitors changes in the touch panel output to determine whether a finger is brought into contact with the tactile IF panel 3. In the case of a capacitive touch panel, the controller 8 monitors changes in electrostatic capacitance. When a change in the touch panel output exceeds a threshold value, the controller 8 determines that a finger is in contact with the tactile IF panel 3.

The controller 8 then determines whether the finger is in contact with the start position S (S22). The controller 8 determines whether the finger is located at the start position S, in accordance with the signal output from the touch panel. If the finger is not in contact with the start position S (NO in S22), the process returns to S21.

If the finger is in contact with the start position S (YES in S22), the controller 8 determines a rotation angle θ between the tactile presentation positions (S23). In FIG. 9, the rotation angle θ is constant until an input of one digit of the authentication code is confirmed. The rotation angle θ may be changed for each digit, or may be the same for each digit. The controller 8 then outputs an ON signal to the drive circuit 9, to cause the tactile IF panel 3 to vibrate in the ultrasonic band (S24). At this stage, the upper surface of the tactile IF panel 3 enters a low-friction state, and accordingly, the finger can be moved smoothly.

The controller 8 then monitors movement of the finger in accordance with the output from the touch panel (S25), and determines whether the finger has rotated the rotation angle θ (S26). If the finger has not rotated the rotation angle θ (NO in S26), the process returns to S24. If the finger is determined to have rotated the rotation angle θ (YES in S26), a different tactile feel from the tactile feel presented so far is presented. In the example illustrated in FIG. 9, the controller 8 outputs an OFF signal to the drive circuit 9 to stop the vibration of the tactile IF panel 3 (S27). At this stage, the upper surface of the tactile IF panel 3 enters a high-friction state, and thus, the finger being slid on the upper surface can feel like being caught, and recognize the tactile feel. The controller 8 increments the count value n indicating the number of tactile presentations by 1 (S28). The count value n is held by the controller 8.

The controller 8 then monitors movement of the finger (S29), and determines whether the finger has been temporarily removed from the tactile IF panel 3, and then been returned to the start position S (S30). The controller 8 determines whether the finger is located at the start position S in accordance with the signal output from the touch panel. If the finger has not been returned to the start position S (NO in S30), the process returns to S24. If the firmer has been returned to the start position S (YES in S30), the controller 8 confirms the count value n as the value of the authentication code digit being currently input (S31).

The controller 8 determines whether all the digits of the authentication code have been input (S32). If not all the digits have been input (NO in S32), the controller 8 changes the processing target to the next digit (S33). The process then returns to S23, and the input process for the next digit is performed. If all the digits have been input (YES in S32), on the other hand, this input process comes to an end.

In the above description, a method of inputting an authentication code already known to the operator has been explained. In the description below, a method of notifying the operator of a one-time password using tactile feels will be explained.

A one-time password is a password that is only valid for one operation. A one-time password is normally shown in an image, and the operator is prompted to input the same one-time password as that shown in the image. In this embodiment, a one-time password is not shown in an image, but the operator is notified of a one-time password through the number of tactile presentation times. As a result, leakage of the one-time password can be prevented.

Figure 10A:
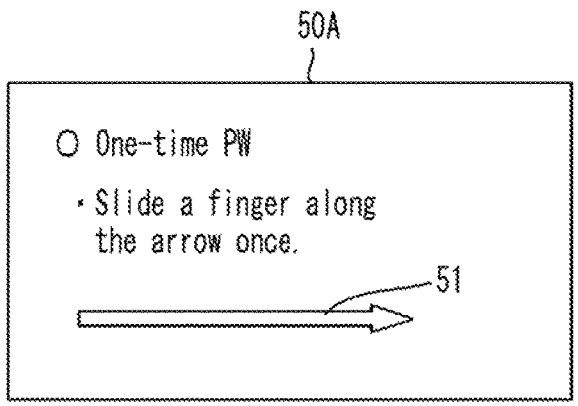
FIG. 10A through FIG. 10C are diagrams illustrating examples of presentation screens for notifying an operator of a one-time password.
Figure 10B:
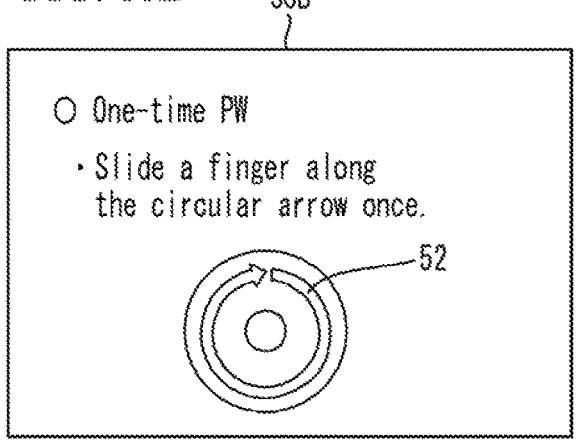
Figure 10C:
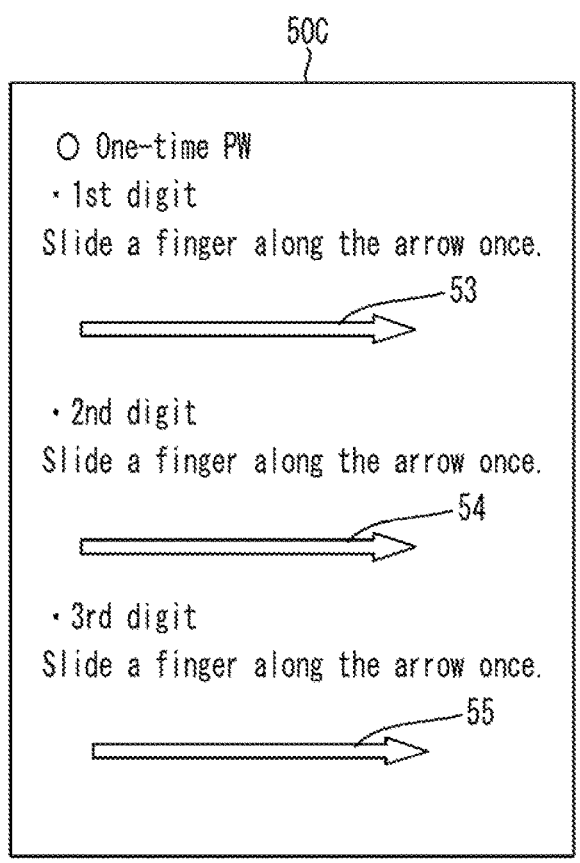
Figure 11A:
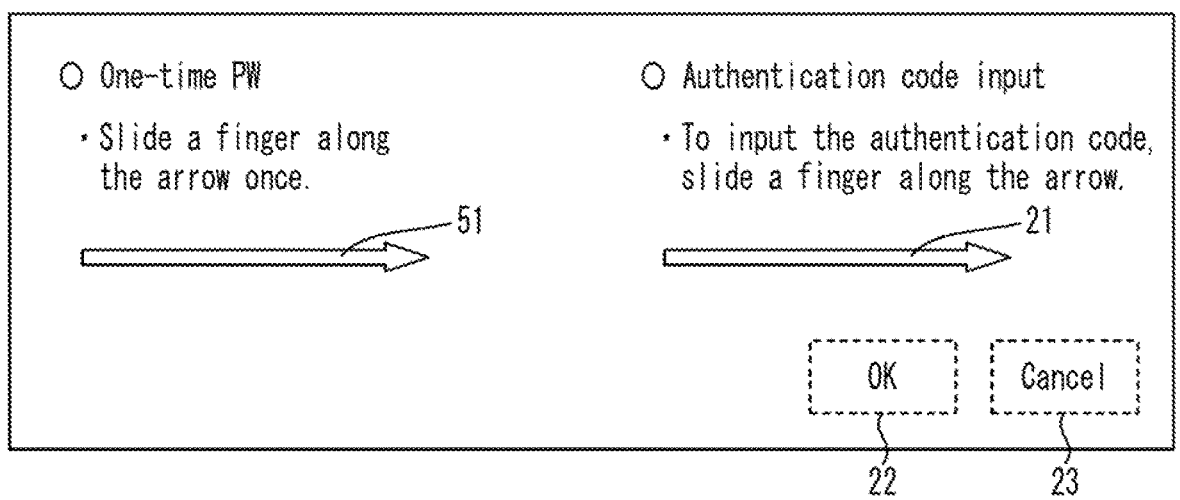
FIG. 11A and FIG. 11B are diagrams illustrating examples of screens for presenting a one-time password and inputting an authentication code.
Figure 11B:
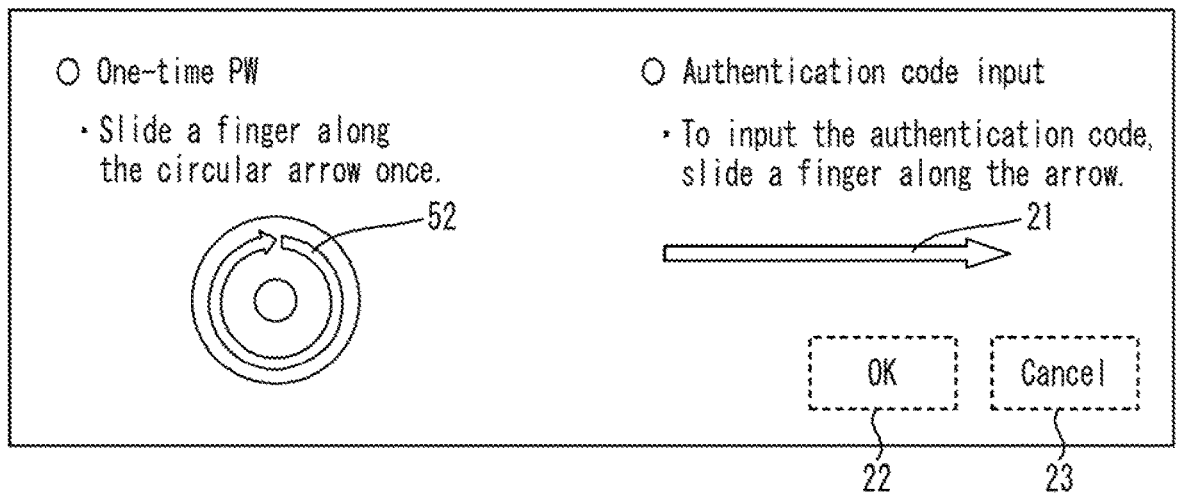

FIG. 10A through FIG. 10C are diagrams illustrating examples of presentation screens for notifying the operator of a one-time password. FIG. 11A and FIG. 11B are diagrams illustrating examples of screens on which one-time password presentation and authentication code input are performed.

A presentation screen 50A illustrated in FIG. 10A includes an arrow-shaped presentation region 51. A presentation screen 50B illustrated in FIG. 10B includes a circular presentation region 52. Meanwhile, a presentation screen 50C illustrated in FIG. 10C includes three presentation regions 53 through 55 corresponding to the respective digits of the one-time password.

Note that, as illustrated in FIG. 11A and FIG. 11B, a combination of a one-time password presentation screen and a code input screen may be displayed as one screen. In FIG. 11A, the presentation screen illustrated in FIG. 10A is combined with the code input screen illustrated in FIG. 3A. In FIG. 11B, the presentation screen illustrated in FIG. 10B is combined with the input screen illustrated in FIG. 3A. In the example illustrated in FIG. 11B, for a clearer distinction between the presentation screen for presenting a one-time password and the input screen for inputting a one-time password, the types of operations are intentionally made different from each other, so that the operation on the presentation screen is circular movement while the operation on the input screen is linear movement. Combinations of a presentation screen and an input screen are not limited to the examples illustrated in FIG. 11A and FIG. 11B. For example, the presentation screen illustrated in FIG. 10B may be combined with the input screen illustrated in FIG. 5A.

Referring back to FIG. 10A through FIG. 10C, when the operator slides a finger on the presentation regions 51 through 55, the operator is notified of the numerical value of the one-time password through the number of tactile presentations. For example, in a case where the number of the presented tactile is three when a finger is slid along the presentation region 51 once or is slid along a circle in the presentation region 52 once, the value of the one-time password is three. Note that the one-time password value of one digit may be presented every time a finger is slid along the presentation region 51 or along a circle in the presentation region 52 once. Otherwise, the one-time password values of all the digits may be presented after a finger is slid along the presentation region 51 along a circle the presentation region 52 once. The one-time password may be presented in a form other than the above.

Figure 12A:
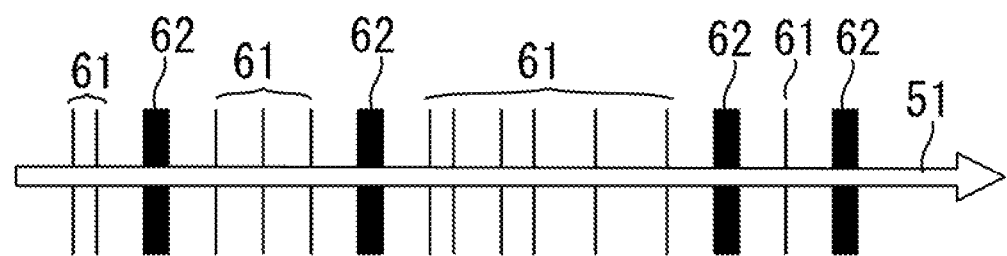
FIG. 12A and FIG. 12B are diagrams illustrating examples in which a four-digit one-time password is presented after a finger is slid once.
Figure 12B:
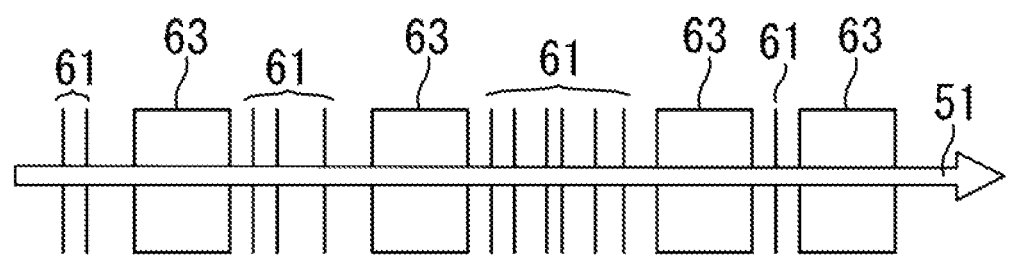

FIG. 12A and FIG. 12B are diagrams illustrating examples in which a four-digit one-time password is presented after a finger is slid along the linear presentation region 51 once. In the examples illustrated in FIG. 12A and FIG. 12B, the four-digit one-time password is "2361".

In FIG. 12A, thin lines 61 and bold lines 62 indicate the tactile presentation positions. The numbers of the thin lines 61 correspond to the numerical values of the respective digits of the one-time password. In the example illustrated in FIG. 12A, the thin lines 61 form a group of two, a group of three, a group of six, and a group of one, so that the operator is notified of the value "2361".

Meanwhile, the bold lines 62 in FIG. 12A indicate the boundaries between the digits of the one-time password. The difference in thickness between the thin lines 61 and the bold lines 62 indicates the difference between the tactile presentation distances of the respective lines. If a finger is moving at substantially a constant speed, the thin lines 61 and the bold lines 62 have a difference in the time in which the operator recognizes tactile presentation. In this manner, the controller 8 controls so that the tactile presentation distance of the bold lines 62 indicating the boundaries between the digits becomes longer than the tactile presentation distance of the thin lines 61. The operator can recognize the boundaries between the digits in accordance with such a difference between tactile feels. Thus, the operator can obtain the numerical values of the four-digit one-time password by sliding a finger once.

In FIG. 12B, the thin lines 61 indicate the tactile presentation positions as in FIG. 12A, and blanks 63 indicate the regions in which no tactile feel is presented, or no signal to drive the piezoelectric elements is output.

The numbers of the thin lines 61 indicate the numerical value of the one-time password, and the blanks 63 indicate the boundaries of the digits. The controller 8 controls so that the length of the blanks 63 in the direction of movement is set larger than the distance between the thin lines 61 of the respective digits. That is, the distance of the regions in which any of the tactile feels corresponding to the boundaries between the digits is not to be presented during a finger sliding operation is made longer than the distance between the tactile presentation positions corresponding to the numerical values of the respective digits, so that the boundaries between the digits become clear. Thus, the operator can recognize the boundaries between the digits, and recognize the numerical value of the four-digit one-time password by sliding a finger once.

The boundaries between the digits are not limited to the forms illustrated in FIG. 12A and FIG. 12B. The tactile feel for presenting a boundary between digits may be made different from the tactile feel for presenting the numerical value of each digit, so that the boundaries between the digits becomes clear.

In FIG. 12A and FIG. 12B, the four-digit one-time password is presented while a finger is slid along the presentation region 51 once. However, the four-digit one-time password may be presented while a finger is slid along a circle in the circular presentation region 52 once.

Figure 13A:
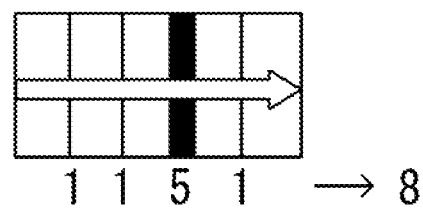
FIG. 13A and FIG. 13B are diagrams illustrating the relationship between the numerical value of a one-time password and tactile presentation distances.
Figure 13B:
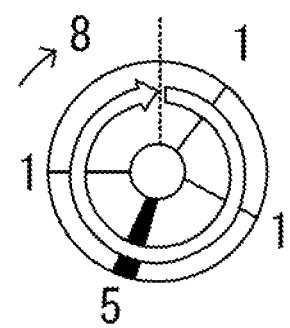

FIG. 13A and FIG. 13B are diagrams illustrating the relationship between the numerical value of a one-time password and tactile presentation distances.

In a case where a numerical value equal to or greater than "2" (such as "5") is to be presented as a numerical value of a one-time password as illustrated in FIG. 13A and FIG. 13B, the controller 8 controls so that the tactile presentation distance corresponding to such numerical value becomes longer than the tactile presentation distance corresponding to the numerical value "1". In this manner, a numerical value equal to or greater than "2" can be indicated through a single tactile presentation.

In a case where "8" is to be presented as the numerical value of a one-time password, for example, a tactile feel may be presented eight times through one operation. However, if the number of tactile presentation times is large, there is a possibility of miscounting of tactile feels. Therefore, a combination of "1" and "5" as illustrated in FIG. 13A and FIG. 13B is presented as the numerical value. In this manner, the number of tactile presentations can be reduced, and miscounting of the number of tactile presentations and the numerical value of the one-time password can be reduced. The operator can determine which one of "1" and "5" is presented in accordance with the duration of the tactile presentation period. In a case where "1" is presented three times, and "5" is presented once as illustrated in FIG. 13A and FIG. 13B, the operator can recognize that the numerical value of the one-time password is "8".

Figure 14:
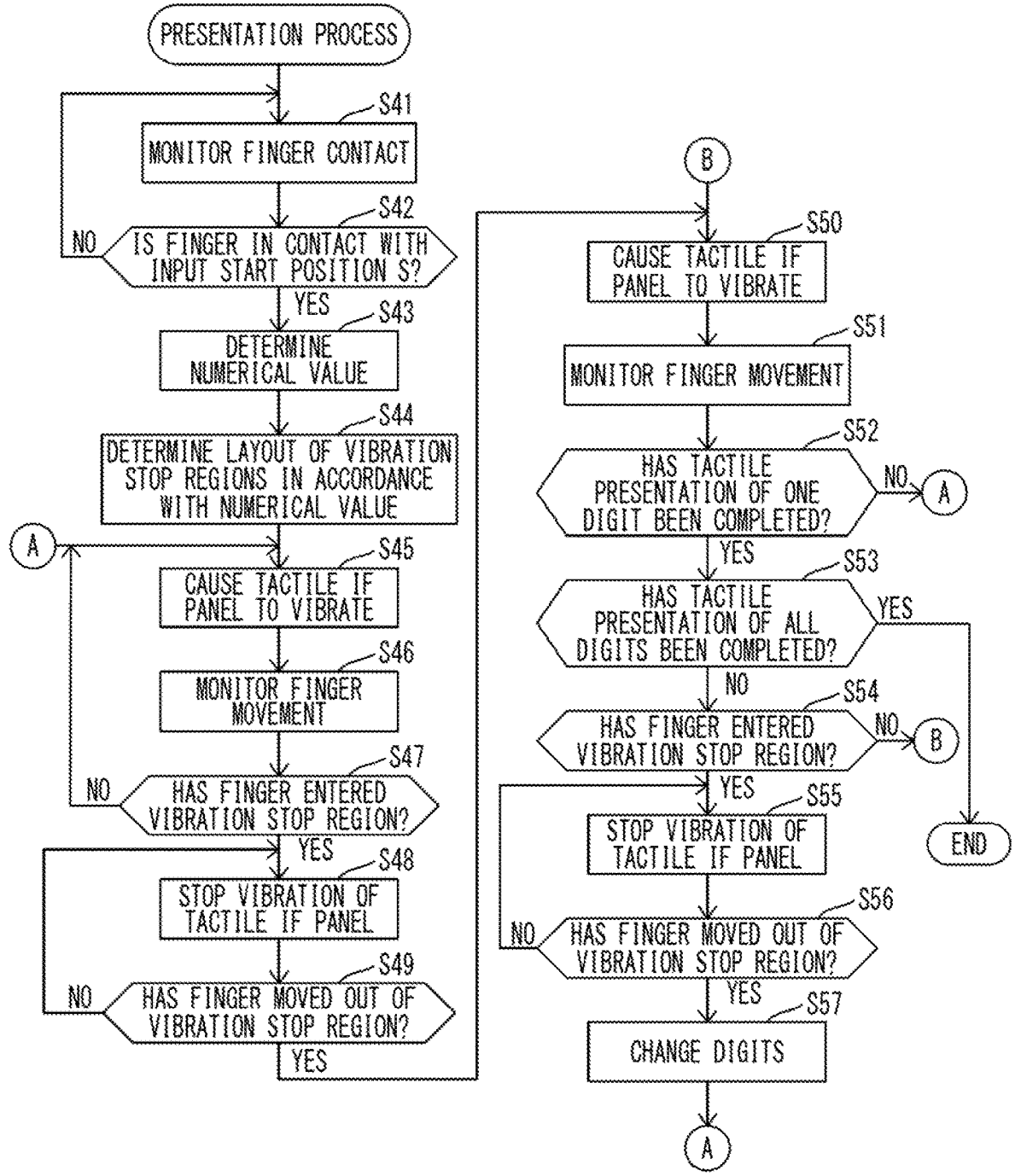
FIG. 14 is a flowchart illustrating the one-time password presentation process illustrated in FIG. 12A.

FIG. 14 is a flowchart illustrating the one-time password presentation process illustrated in FIG. 12A.

First, the controller 8 monitors whether a finger is in contact with the tactile IF panel 3 (S41). The controller 8 monitors changes in the touch panel output to determine whether a finger is brought into contact with the tactile IF panel 3. In the case of a capacitive touch panel, the controller 8 monitors changes in electrostatic capacitance. When a change in the touch panel output exceeds a threshold value, the controller 8 determines that a finger is in contact with the tactile IF panel 3.

The controller 8 then determines whether the finger is in contact with the start position S (S42) in accordance with the output of the touch panel. If the finger is not in contact with the start position S (NO in S42), the process returns to S41.

The controller 8 then sets the numerical value of the one-time password (S43), and determines a tactile presentation mode in accordance with the numerical value. In the example of FIG. 14, the positions and the widths of the thin lines 61 and the bold lines 62 in FIG. 12A are sets (S44). In accordance with the determined tactile presentation mode, the controller 8 outputs an ON signal to the drive circuit 9 to cause the tactile IF panel 3 to vibrate (S45).

The controller 8 monitors movement of the finger (S46), and determines whether the finger has entered a vibration stop region corresponding to the thin line 61 (S47) in accordance with the output of the touch panel. If the finger has not entered a vibration stop region (NO in S47), the process returns to S45, and the vibration continues. If the finger has entered a vibration stop region (YES in S47), the controller 8 changes tactile feels. To do so, the controller 8 outputs an OFF signal to the drive circuit 9, to stop the vibration of the tactile IF panel 3 (S48). Thus, a high-friction tactile feel is presented.

The controller 8 then determines whether the finger has moved out of the vibration stop region, or determines whether the finger has moved out of the region of the thin line 61 (S49). If the finger has not moved out of the vibration stop region (NO in S49), the process returns to S48. If the finger has moved out of the vibration stop region (YES in S49), the finger has passed through the thin line 61. Therefore, the controller 8 outputs an ON signal to the drive circuit 9 to cause the tactile IF panel 3 to vibrate (S50), and a low-friction tactile feel is presented. The controller 8 further monitors movement of the finger (S51), and determines whether tactile presentation of one digit has been completed (S52). If the tactile presentation of one digit has not been completed (NO in S52), the process returns to S45. If the tactile presentation of one digit has been completed (YES in S52), the controller 8 determines whether the tactile presentation of all the digits has been completed (S53). If the tactile presentation of all the digits has been completed (YES in S53), this process comes to an end.

After that, the user inputs the one-time password presented for an authentication process. The one-time password is input through one of the input screens illustrated in FIG. 3A, FIG. 3B, FIG. 5A, FIG. 5B, FIG. 11A, and FIG. 11B. In the example of FIG. 13A and FIG. 13B, the operator slides a finger along the operation region, and confirms the input when recognizing a tactile feel for the eighth time. Note that, as password leakage can be prevented if numbers cannot be visually recognized when presenting the one-time password, the one-time password may be input through numerical keys or the like, instead of an input screen using tactile feels.

If the tactile presentation of all the digits has not been completed (NO in S53), the controller 8 determines whether the finger has entered a vibration stop region corresponding to the bold line 62 (S54). If the finger has not entered a vibration stop region (NO in S54), the process returns to S50. If the finger has entered a vibration stop region (YES in S54), the controller 8 outputs an OFF signal to the drive circuit 9 to stop the vibration of the tactile IF panel 3, and present a tactile feel corresponding to the bold line 62 (S55). The controller 8 then determines whether the finger has moved out of the vibration stop region corresponding to the bold line 62 (S56). If the finger has not moved out of the vibration stop region (NO in S56), the process returns to S55, and the tactile presentation of the hold line 62 is continued. If the finger has moved out of the vibration stop region (YES in S56), the controller 8 changes the processing target to the next digit (S57), and the process returns to S45.

Note that the procedures in S47 through S49 indicate the process that starts when the finger enters the thin line 61 in FIG. 12A and ends when the finger moves out of the thin line 61, and the procedures in S54 through S56 indicate the process that starts when the finger enters the bold line 62 in FIG. 12A and ends when the finger moves out of the bold line 62.

Figure 15:
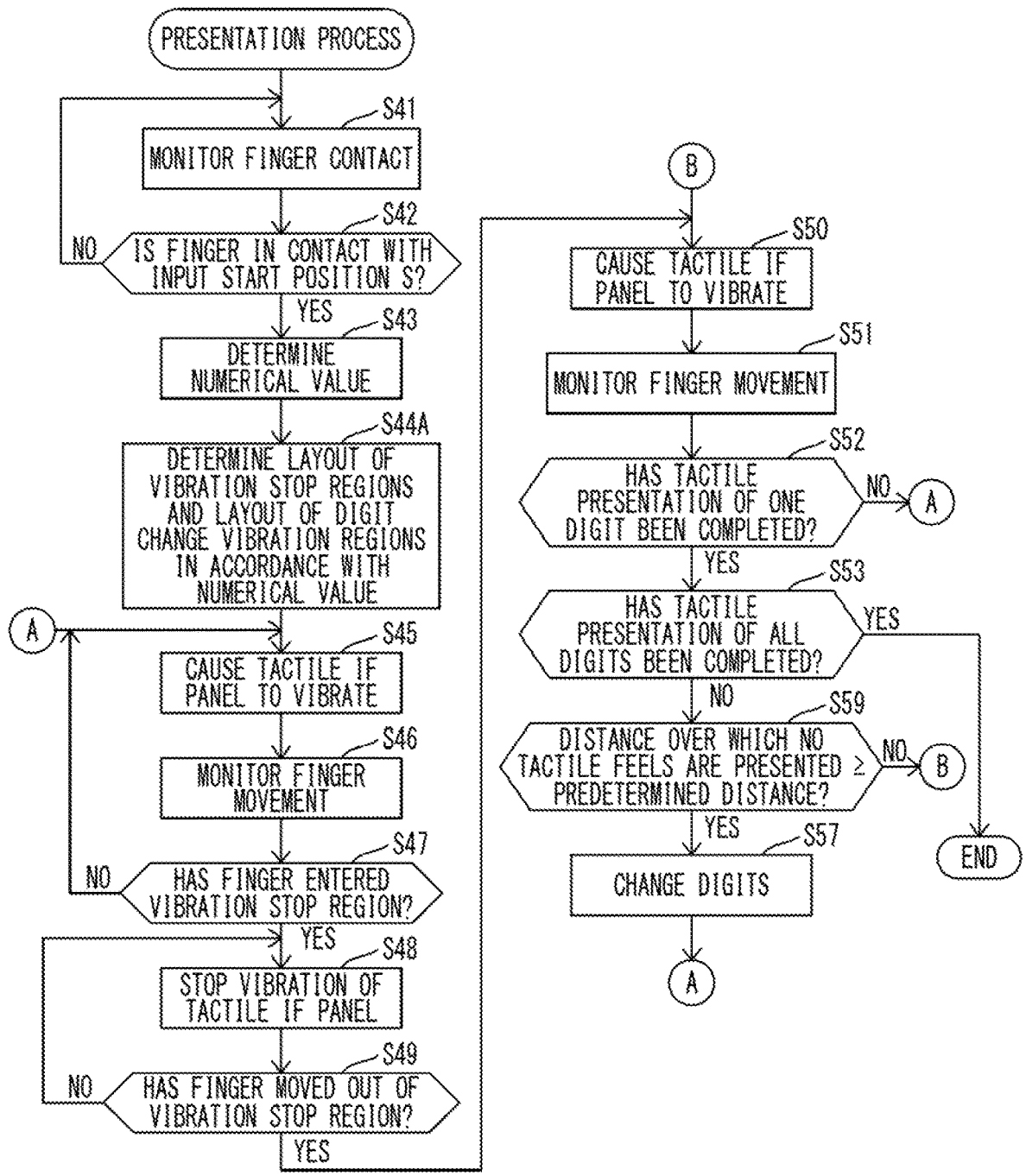
FIG. 15 is a flowchart illustrating the one-time password presentation process illustrated in FIG. 12B.

FIG. 15 is a flowchart illustrating the one-time password presentation process illustrated in FIG. 12B. Note that the same procedures as those in FIG. 14 are denoted by the same numbers as those illustrated in FIG. 14, and explanation of them is not repeated herein.

After setting the numerical value of the one-time password (S43), the controller 8 sets the layout of the vibration stop regions corresponding to the thin lines 61 in FIG. 12B and the digit changing vibration regions corresponding to the blanks 63 in FIG. 12B (S44A).

If it is determined that the tactile presentation of all the digits has not been completed (NO in S53), the controller 8 determines whether the distance the finger moved in a region where no tactile feel is presented is equal to or shorter than a predetermined distance (S59). If the moving distance of the finger is shorter than the predetermined distance (NO in S59), the process returns to S50. If the moving distance of the finger is equal to or longer than the predetermined distance (YES in S59), the controller 8 changes the processing target to the next digit (S57), and the process returns to S45.

Figure 16:
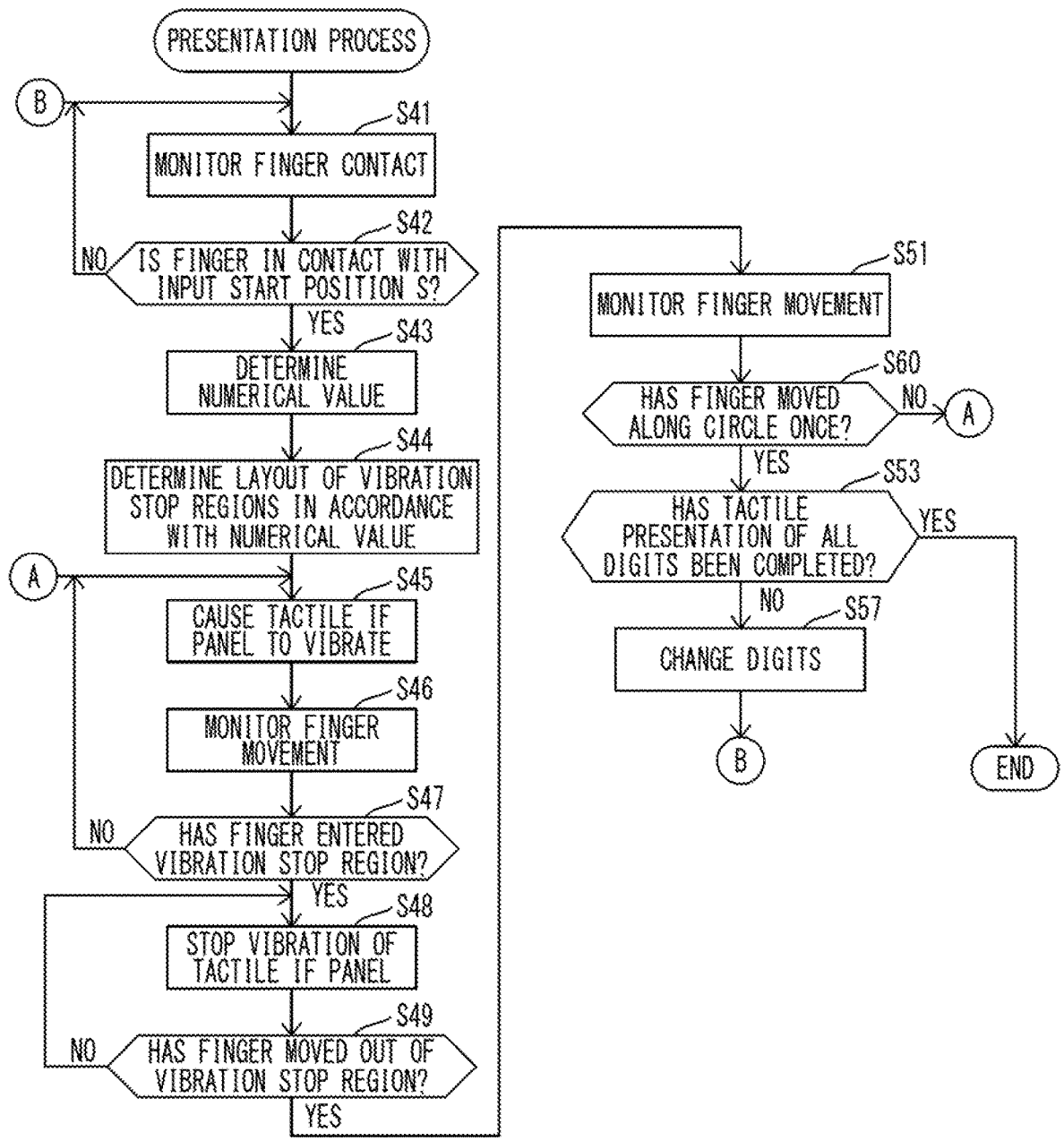
FIG. 16 is a flowchart illustrating the one-time password presentation process illustrated in FIG. 10B.

FIG. 16 is a flowchart illustrating the one-time password presentation process illustrated in FIG. 10B. In this process, the presentation region is a circular region, and a finger is slid and rotated along a circle in the presentation region once to present the numerical value of one digit of a one-time password. In a case where the numerical values of two or more digits are to be presented, the finger is slid and rotated along a circle in the presentation region the same number of times as the number of the digits. Note that the same procedures as those in FIG. 14 are denoted by the same numbers as those illustrated in FIG. 14, and explanation of them is not repeated herein.

If the finger has moved out of the vibration stop region (YES in S49), the controller 8 monitors movement of the finger (S51), and determines whether the finger has rotated along a circle in the presentation region once, in other words, whether the tactile presentation of one digit has been completed (S60).

If the finger has not moved along a circle once (NO in S60), the process returns to S45, and the process of presenting the numerical value of the digit of the one-time password is continued. If the finger has rotated along a circle once (YES in S60), it is determined that the presentation of the numerical value of the digit has been completed, and the process moves on to S53.

If the result is NO in S53, the numerical values of all the digits have not been presented, the process moves on to S57. After a process of changing digits, the process returns to S41, and the numerical value of the next digit is presented. If the numerical values of all the digits have been presented, the result in S53 is YES, and the process illustrated in FIG. 16 comes to an end.

After that, the operator inputs the presented one-time password through the code input screen. In response to this, an authentication process is performed on the input authentication code.

As described so far, according to this embodiment, the controller 8 controls the tactile IF panel 3 to present a tactile feel in accordance with the detected position of a finger. The number of times a tactile feel has been presented on the tactile IF panel 3 before the input confirming operation is confirmed as the authentication code. Since time is not used as a trigger to present a tactile feel, the authentication code input time can be shortened accordingly. Further, the authentication code is not seen or recognized by others, and thus, leakage of the authentication code can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various change, substitutions, and alterations could be made hereto without departing from the spirit and scope of the invention.

What is claimed is:

1. An input device comprising:
   a tactile interface panel;
   a touch panel provided beneath the tactile interface panel;
   a tactile presentation device that is mounted on the tactile interface panel, and presents one or more tactile feels; and
   a control device that detects a position of a finger on the tactile interface panel in accordance with information from the touch panel, controls the tactile presentation device to present the one or more tactile feels in accordance with the position of the finger during a period from the start of touching the tactile interface to input confirmation, determines the number of times the tactile feel is presented before the input confirmation, and confirms the determined number as an input value.

2. The input device according to claim 1, wherein a presentation interval between the tactile feels to be presented in one sliding operation is determined in accordance with an amount of movement of the finger.

3. The input device according to claim 2, wherein the amount of movement of the finger during the presentation interval between the tactile feels varies randomly.

4. The input device according to claim 1, wherein the input confirmation is one of removing the finger from the tactile interface panel, not moving the finger for longer than a certain period of time, reversing a sliding direction of the finger, and pressing a particular key.

5. An input device comprising:
   a tactile interface panel;
   a touch panel provided beneath the tactile interface panel;
   a tactile presentation device that is mounted on the tactile interface panel, and presents one or more tactile feels to an operator; and
   a control device that detects a position of a finger on the tactile interface panel in accordance with information from the touch panel, determines the number of times the tactile feel is presented while the finger slides on the tactile interface panel, as a password, and controls the tactile presentation device to present the tactile feel corresponding to the determined number.

6. The input device according to claim 5, wherein a tactile feel corresponding to a boundary between digits of the password is presented as a different tactile feel from the tactile feel presented in accordance with the password.

* * * * *